United States Patent [19]

Farquhar et al.

[11] Patent Number: 5,687,755

[45] Date of Patent: Nov. 18, 1997

[54] EQUIPMENT COMPRISING A CONDENSATE TRAP

[75] Inventors: Keith Robert Farquhar, Cheltenham; Keith Dewhirst, Stroud, both of United Kingdom

[73] Assignee: Spirax-Sarco Limited, Gloucestershire, United Kingdom

[21] Appl. No.: 671,878

[22] Filed: Jun. 28, 1996

[30] Foreign Application Priority Data

Jun. 29, 1995 [GB] United Kingdom ............... 9513268

[51] Int. Cl.$^6$ ........................................... F16T 1/00
[52] U.S. Cl. ........................ 137/182; 137/183; 137/625.32
[58] Field of Search ............................ 137/182, 183, 137/625.32

[56] References Cited

U.S. PATENT DOCUMENTS

| | | | |
|---|---|---|---|
| 3,916,936 | 11/1975 | Villaume et al. | 137/204 |
| 5,445,187 | 8/1995 | Farquhar | 137/182 X |

FOREIGN PATENT DOCUMENTS 2 279 431  1/1995  United Kingdom .

Primary Examiner—Gerald A. Michalsky
Attorney, Agent, or Firm—McDermott, Will & Emery

[57] ABSTRACT

A condensate trap assembly 12 includes a valve body 28 accommodating a condensate trap element 34 and a valve element 36. The valve element 36 is movable by a positioner 26 to direct flow in a condensate line 10 either through the condensate trap afforded by the trap element, or through the valve bypassing the condensate trap, or to shut off the condensate line 10. The positioner rotates the valve element 36 under the control of control means 54 which responds to signals from a sensor 24 detecting the presence or absence of condensate in a monitoring chamber 16 and the temperature within the chamber 16. The control means 54 is also responsive to the temperature sensed by a temperature sensor 22 upstream of a process 2 utilizing steam or other fluid which is applied to the condensate trap assembly 12.

12 Claims, 4 Drawing Sheets

EQUIPMENT COMPRISING A CONDENSATE TRAP

BACKGROUND OF THE INVENTION AND PRIOR ART

This invention relates to equipment comprising a condensate trap.

U.S. Pat. No. 5,445,187 discloses a condensate trap assembly having a valve body and a condensate trap provided in the valve body, the valve body accommodating a valve element which is manually movable. The valve element can be positioned to direct fluid to the condensate trap, to bypass the condensate trap or to shut off the flow entirely.

The purpose of the condensate trap assembly disclosed in GB-A-2279431 is to provide a manual override capacity if, for example, the condensate trap is to be removed for servicing or replacement.

However, in some circumstances, faulty operation of a condensate trap can immediately have adverse consequences, and so it would be desirable for override to occur without the intervention of a human operator so as to ensure prompt remedial action in the event that the trap becomes faulty.

SUMMARY OF THE INVENTION

According to the present invention there is provided equipment comprising a condensate trap assembly having a valve body and a condensate trap provided in the valve body, the valve body having an inlet and an outlet and accommodating a valve element which is movable by drive means between three operating positions in which respectively (i) the inlet is isolated from the condensate trap and from the outlet, (ii) the inlet communicates directly with the outlet, bypassing the condensate trap, and (iii) the inlet communicates with the outlet through the condensate trap, the drive means being controlled by control means which has at least one input for receiving a signal generated by sensing means which is responsive to an operating condition of the equipment.

With such equipment, faulty operation of the condensate trap can be detected by the control means and remedial action can be taken by appropriate operation of the valve element by the drive means. Also, the positioning of the valve element can be made dependant on the state of process means disposed upstream of the condensate trap assembly.

The drive means may comprise a rotary positioner which adjusts the angular position of the valve element. The drive means may be electrically powered.

The sensing means may be responsive to the presence or absence of condensate at a location upstream of the condensate trap. The sensing means may also, or alternatively, be responsive to the temperature of fluid at a location upstream of the condensate trap. For example, a monitoring chamber may be provided upstream of the condensate trap assembly, with the outlet of the monitoring chamber connected to the inlet of the valve body. The sensing means may comprise one or more sensors provided in the monitoring chamber to detect the presence of condensate and to respond to the temperature of the condensate or vapour in the monitoring chamber.

The equipment may include process means disposed upstream of the condensate trap assembly. The process means may, for example, be a process vessel having a steam jacket. Steam supplied to the jacket at a predetermined temperature will maintain the process vessel at a desired temperature. The sensing means may be responsive to the steam temperature at the inlet to the steam jacket so that the steam temperature influences the operation of the valve element by the drive means. The sensing means may also be responsive to an operative condition of the process means. For example, if the process means includes a door, the position of the valve element may be dependent upon whether the door is open or closed.

In a preferred embodiment, the control means operates to position the valve element so that it will act as a condensate trap should the condensate trap within the valve body operate incorrectly. Thus, should the sensing means indicate that the condensate trap is leaking, the control means will position the valve element to shut off the inlet of the valve body. Similarly, should the sensing means indicate that the condensate trap has failed in the closed position, the control means will position the valve element to bypass the condensate trap.

DESCRIPTION OF A PREFERRED EMBODIMENT

Figure 1:
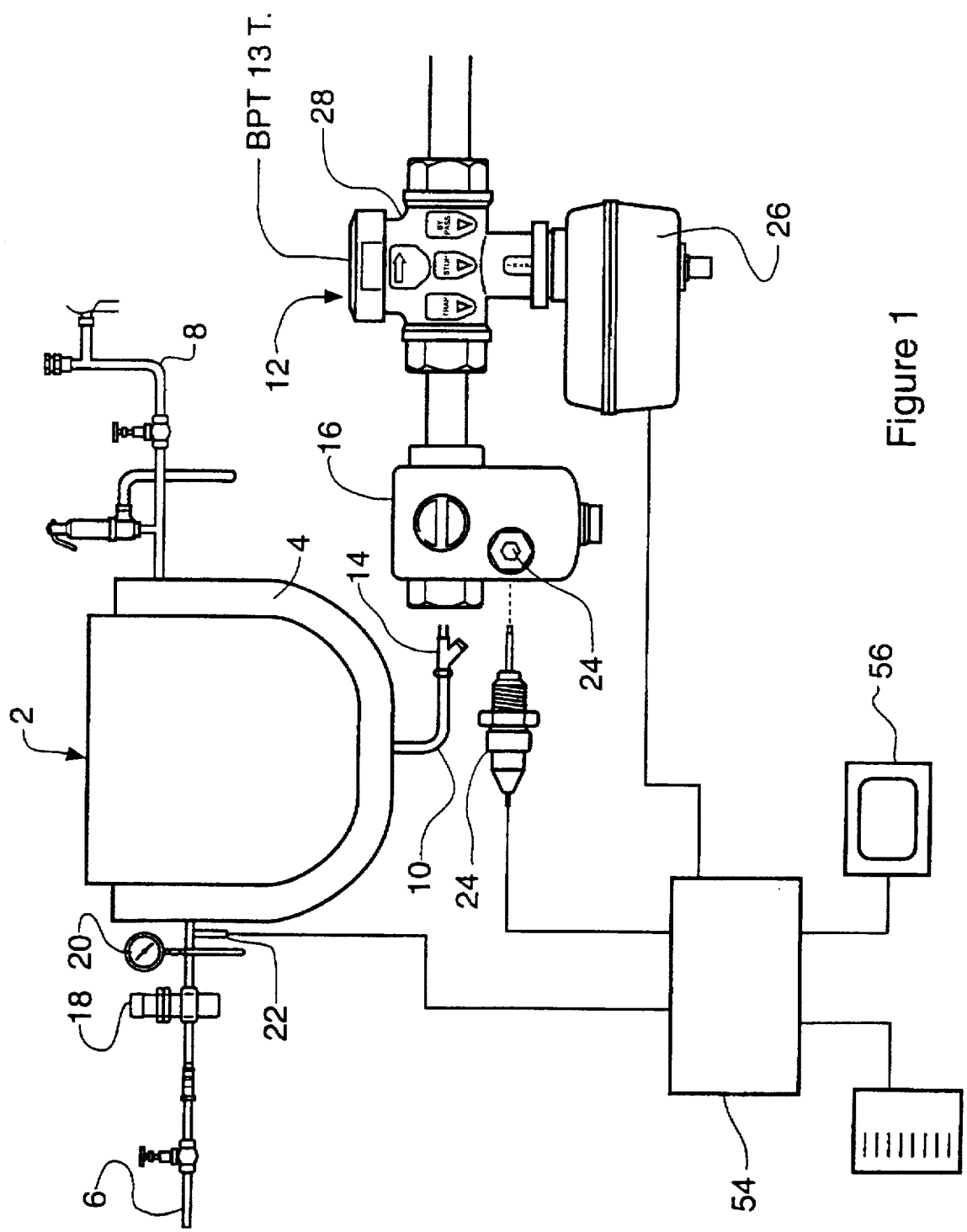
FIG. 1 shows, in a diagrammatic form, equipment including a condensate trap assembly.

The equipment of FIG. 1 includes a process vessel 2 which has a steam jacket 4. The steam jacket 4 is supplied with steam through an inlet pipe 6 and, after passing through the steam jacket 4, the steam is conveyed away through an outlet pipe 8.

At the bottom of the steam jacket 4, there is a condensate line 10. The condensate line 10 connects the steam jacket 4 to a condensate trap assembly 12 through a strainer 14 and a monitoring chamber 16.

The inlet pipe 6 has a pressure regulating valve 18, a pressure gauge 20 and a temperature sensor 22.

The monitoring chamber 16 may be similar to that disclosed in U.S. Pat. No. 5,445,187, the disclosure of which is incorporated herein be reference, and comprises a chamber within which condensate can collect, and a sensor 24. For clarity, FIG. 1 shows the sensor 24 both fitted to the monitoring chamber 16 and separately. The sensor 24 is a conductivity sensor, and so is capable of detecting whether the sensor is submerged in condensate within the monitoring chamber 16 (i.e. the sensor is "wet") or is surrounded by vapour or air (i.e. the sensor is "dry"). The sensor 24 also includes a temperature detector.

The condensate trap assembly 12 is similar to that disclosed in U.S. Pat. No. 5,445,187, except that it is controlled by a rotary positioner 26 instead of manually. The assembly 12 is shown in greater detail in FIGS. 2(a), 2(b) and 2(c). Referring to the central diagram (FIG. 2(b)), the assembly comprises a valve body 28 having an inlet 30 and an outlet 32. The valve body 28 accommodates a condensate trap element 34 and a valve element 36. The condensate trap 34 is situated in a trap chamber 42. The valve element is rotatable between three positions, which can be termed "bypass", "stop" and "trap" and are shown respectively in FIGS. 2(a), (b) and (c).

Figure 2A:
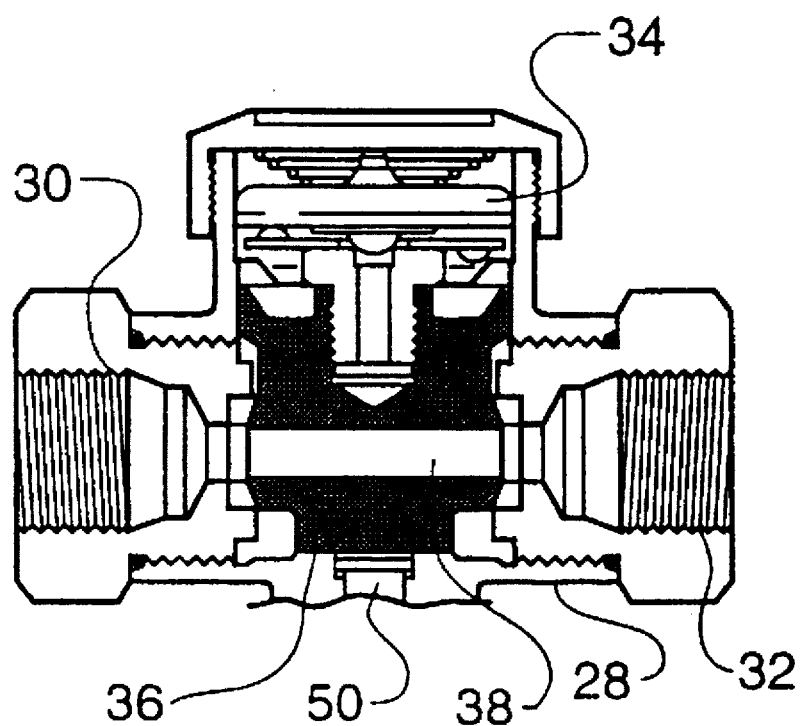
FIGS. 2(a), 2(b), and 2(c) show the condensate trap assembly in three different operative conditions.

In the "bypass" position shown in FIG. 2(a), the valve element 36 is positioned so that a bypass duct 38 in the valve element connects the inlet 30 to the outlet 32. In this position, flow in the condensate line 10 will pass through the valve body 28 bypassing the condensate trap element 34.

Figure 2B:
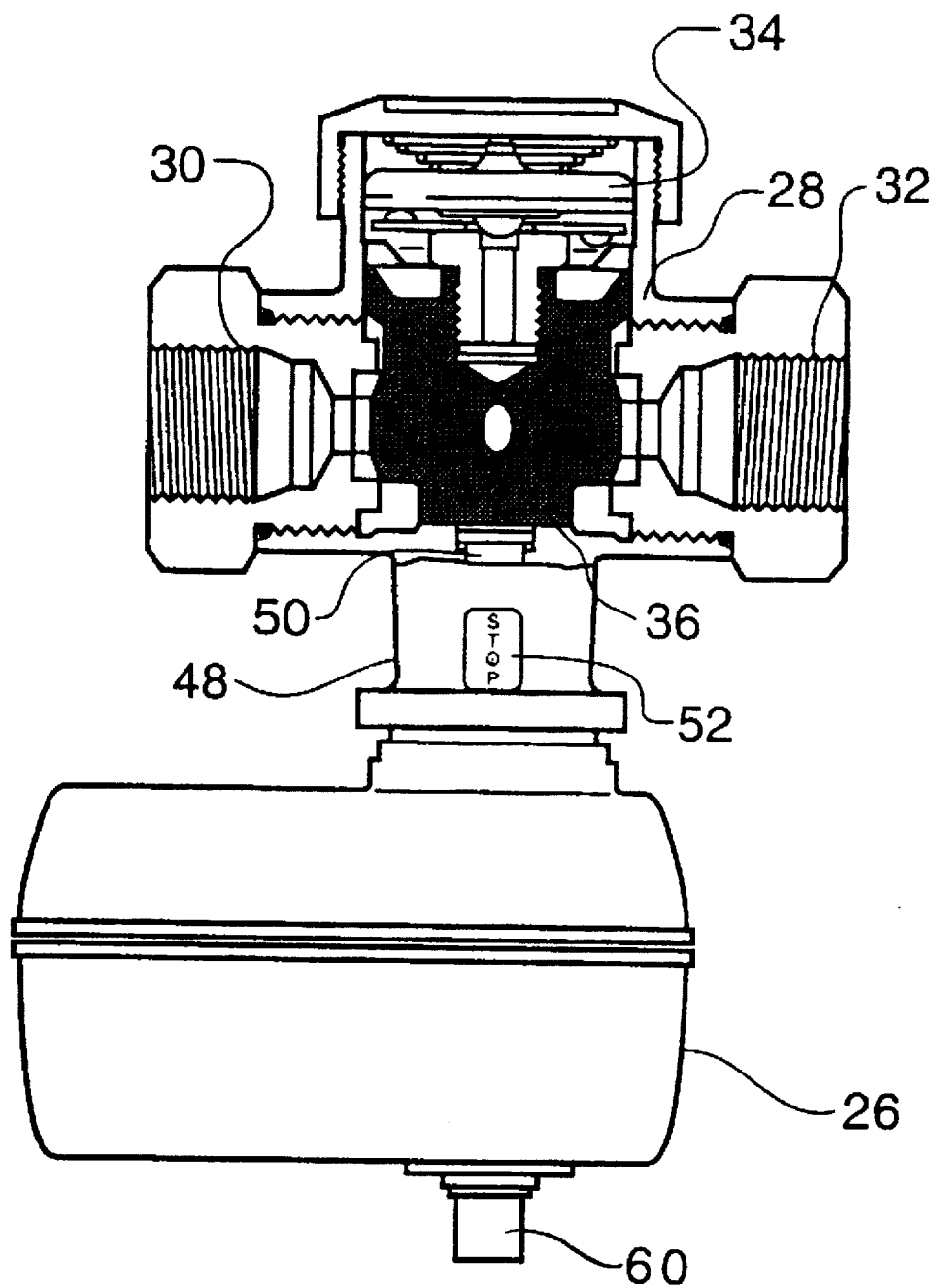

In the "stop" position shown in FIG. 2(b), the valve element 36 is rotated through 45° from the position shown in FIG. 2(a), and the valve element 36 closes both the inlet 30 and the outlet 32. Consequently, the condensate duct 10 is closed at the condensate trap assembly 12.

Figure 2C:
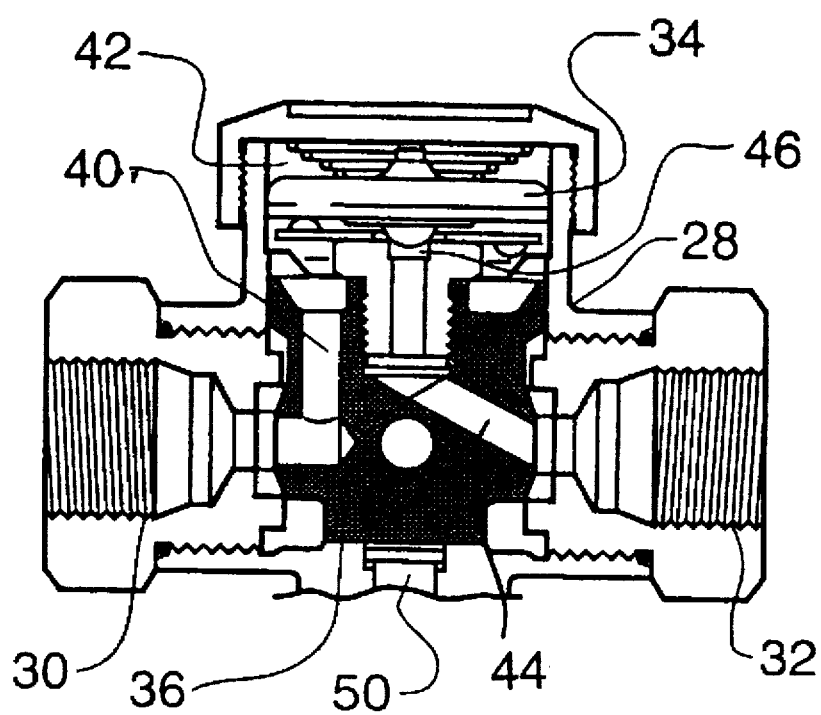

In the "trap" position shown in FIG. 2(c), the valve element 36 is rotated through 90° from the position shown in FIG. 2(a). A trap inlet passage 40 connects the inlet 30 to the trap chamber 42. Also, a trap outlet passage 44 connects the trap chamber 42 to the outlet 32. The trap element cooperates with a valve seat 46 to control flow through the trap chamber 42 from the trap inlet passage 40 to the trap outlet passage 44.

Rotation of the valve element 36 is performed by the electrically powered rotary positioner 26. The positioner 26 has a square cross-sectional spigot 60 which can be engaged by a suitable tool to provide manual override. The positioner 26 is carried on a projection 48 of the valve body 28 and rotates the valve element 36 by means of a spindle 50. The projection 48 has a window 52 within which is displayed an indication of the position of the valve element 36. Referring to FIG. 1, the positioner 26 is connected to control means 54 shown only diagrammatically in FIG. 1. The control means may, for example, comprise a computer. The control means 54 receives signals from the level and temperature sensor 24 and from the temperature sensor 22. The control means 54 may be connected to display equipment, which may be a computer screen 56 and/or an indicator panel 58.

In normal steady-state operation, the trap assembly is in the condition shown in FIG. 2(c), with the valve element 36 in the "trap" position so that the inlet 30 is connected to the outlet 32 through the trap chamber 42. Steam flows to the steam jacket 4 through the inlet pipe 6 to heat the contents of the process vessel 2. The temperature of the steam in the steam jacket is controlled by means of the pressure regulator 18. Because the process steam supplied through the inlet pipe 6 is saturated, the temperature of the steam in the steam jacket 4 will depend directly on the pressure. If any of the steam condenses to form water within the steam jacket 4, the condensed water will drain to the condensate line 10, and will pass through the strainer 14 to the monitoring chamber 16. Eventually, the temperature at the trap element 34 will drop, and this will cause the trap element to open the valve seat 46, allowing condensate to be discharged from the condensate line 10 and the monitoring chamber 16. When the fluid running through the trap chamber 42 is vapour, the resulting increased temperature will cause the trap element 34 to close the seat 46 again, preventing loss of steam. In normal operation, when the trap element is working correctly in conjunction with the seat 46, the sensor 24 in the monitoring chamber 16 will be submerged in the condensate and will be at a temperature close to that of the steam in the steam jacket 4. As the trap element 34 operates, condensate accumulating in the monitoring chamber 16 will be discharged. Consequently, the level of condensate in the chamber 16 will rise and fall but the sensor 24 will nearly always be "wet". By way of example, if the pressure set by the regulator 18 is 10 bar, the temperature of the steam entering the steam jacket 4, as detected by the temperature sensor 22, will be 185° C. In such circumstances, the control means 54 can be set so that, provided the temperature detected by the sensor 24 remains above 165° C., the valve element 36 will remain in the position shown in FIG. 2(c), and the trap element 34 will control the discharge of condensate.

If the trap element 34 fails to close the valve seat 46 adequately, for example because debris is trapped between the trap element 34 and the valve seat 46, steam will continue to pass through the trap when all condensate has been discharged, and the sensor 24 will be "dry". It will also detect a temperature close to 185° C. (i.e. above the predetermined limit value of 165° C.). Under these circumstances, the control means 54 will supply a signal to the positioner 26 to rotate the valve element 36 to the "stop" position shown in FIG. 2(b), in which the inlet 30 is closed. This prevents the continued escape of steam.

The control means may be programmed to return the valve element 36 to the "trap" position shown in FIG. 2(c) after remaining in the "stop" position for a predetermined time. This will have the effect of sending a blast of steam and/or condensate through the trap chamber 42, which may dislodge any debris from the trap element 34 or the valve seat 46. This cycling between the "stop" and "trap" positions may continue for a predetermined number of cycles (for example, five), following which an alarm may be generated.

If the trap fails closed, it will become waterlogged, and the monitoring chamber 16 will fill with condensate. The temperature of condensate will eventually drop below the predetermined value of 165° C. If this happens, the control means 54 will cause the positioner 26 to rotate the valve element 38 to the position shown in FIG. 2(a). As a result, the accumulated condensate will be discharged through the bypass duct 38. Once the condensate has cleared from the monitoring chamber 16, the sensor 24 will be subjected to steam, and consequently it will register "dry" at a temperature above 165° C. This will cause the valve element 36 to move to the "stop" position of FIG. 2(b) until condensate has accumulated in the monitoring chamber 16 to the level of the sensor 24. Then, the control means 54 will cause the valve element 36 to return to the "trap" position. Again, if, after a predetermined number of such cycles, the trap element continues to fail to operate, an alarm signal may be generated.

During start-up, the steam jacket 4 will be cold, and may contain air. The control means 54 can be programmed so that, if the temperature at the sensor 24 is below, for example, 70° C., the valve element 36 will be positioned in the "bypass" position of FIG. 2(a), and the air will be vented from the steam jacket 4 through the bypass duct 38. As steam reaches the steam jacket 4 and passes through the monitoring chamber 16, the sensor 24 will detect the increased temperature. When the temperature reaches the predetermined value of 165 degrees C., the valve element 36 will be rotated to the "trap" position and normal operation of the trap element 34 will occur.

Should the steam pressure in the system fall, this will cause a drop in the steam temperature to below the threshold of 165° C. This would cause the valve element 36 to be moved to the "bypass" position as though the trap were waterlogged. However, after any condensate had been discharged, the sensor 24 would register a "dry" signal. Under these circumstances, the control means 54 could be programmed to return the valve element to the "trap" position, and to generate an alarm.

In the installation shown in FIG. 1, the control means is responsive not only to the sensor 24 which detects conditions just upstream of the condensate trap assembly 12, but also to the conditions upstream of the process vessel 2, by way of the temperature sensor 22. It is also possible for the control means 54 to respond to other operating conditions of the process means, whether in the form of the process vessel 2 or in the form of other processing equipment. For example, the processing equipment may be a sterilising cabinet through which steam passes to sterilise articles within the cabinet. Sometimes, it is desirable to apply a vacuum to the cabinet to extract air from it before the steam is admitted, particularly when porous articles are to be sterilised. If a vacuum is to be applied, even if the sensor 24 indicates start-up conditions under which the trap element 34 would normally open the seat 46, the condensate line 10 must be closed. Consequently, the control means 54 could be supplied with a signal indicating that vacuum is being applied to the sterilising cabinet, and this would cause the valve element 36 to be rotated to the "stop" position shown in FIG. 2(b), allowing the vacuum to be supported.

Equipment as described above combines the benefits of a conventional condensate trap, requiring no power supply, with a powered system which can identify faulty operation and, in some circumstances, rectify the faulty operation. Since power needs to be supplied to the positioner only when the valve element is to be rotated, the overall power consumption of the trap assembly 12 is low. Furthermore, because the bypass duct 38 can be significantly larger in flow cross-section than the gap between the trap element 34 and the seat 46 when the trap is open, the "bypass" function of the assembly has a high capacity, allowing rapid venting on equipment start-up, and the ability to deal with start up loads in excess of the capacity of the trap element 34.

It will be appreciated that a major advantage of the trap assembly 12 as described above is that, where the trap element 34 fails in the open or closed position, the assembly will continue to function as a condensate trap, by way of the powered rotation of the valve element 38. The ability to override the control means 54 or the positioner 26, either by direct manual input into the control means 54 (for example by way of a keyboard), or by rotating the spigot 60 means that the valve element 36 can be moved to any desired position, for example to the "stop" position should it be necessary to gain access to the trap element 34, for servicing or replacement.

Although the system shown in FIG. 1 represents a single trap assembly 12 controlled by the control means 54, it would be possible for the control means to be connected to several trap assemblies 12, perhaps as part of an energy monitoring arrangement for a complete steam system.

We claim:

1. Equipment comprising a condensate trap assembly having a valve body and a condensate trap provided in the valve body, the valve body having an inlet and an outlet and accommodating a valve element which is movable by drive means between three operative positions in which respectively (i) the inlet is isolated from the condensate trap and from the outlet,
   (ii) the inlet communicates directly with the outlet, bypassing the condensate trap, and
   (iii) the inlet communicates with the outlet through the condensate trap, control means being provided which is adapted to control the drive means, the control means having at least one input for receiving a signal generated by sensing means which is responsive to an operative condition of the equipment.

2. Equipment as claimed in claim 1, in which the valve element is rotatable to change its operative position, and in which the drive means comprises a rotary positioner.

3. Equipment as claimed in claim 1 or 2, in which the drive means is electrically powered.

4. Equipment as claimed in claim 1, in which the sensing means is responsive to the presence or absence of condensate at a location upstream of the condensate trap.

5. Equipment as claimed in claim 1, in which the sensing means is responsive to the temperature of fluid at a location upstream of the condensate trap.

6. Equipment as claimed in claim 1, further comprising process means disposed upstream of the condensate trap assembly, the process means utilizing fluid flowing in a fluid line which communicates with the inlet of the valve body.

7. Equipment as claimed in claim 6, in which the sensing means is responsive to an operative condition of the process means.

8. Equipment as claimed in claim 6, in which the sensing means is responsive to the temperature of the fluid at a location upstream of the process means.

9. Equipment comprising a condensate trap assembly having a valve body and a condensate trap provided in the valve body, the valve body having an inlet and an outlet and accommodating a valve element which is movable by drive means between three operative positions in which respectively (i) the inlet is isolated from the condensate trap and from the outlet,
   (ii) the inlet communicates directly with the outlet, bypassing the condensate trap, and
   (iii) the inlet communicates with the outlet through the condensate trap, the drive means being controlled by control means which has at least one input for receiving a signal generated by sensing means which is responsive to the presence or absence of condensate at a location upstream of the condensate trap and to the temperature of fluid at the said location.

10. Equipment as claimed in claim 9, in which the control means is adapted to position the valve element to place the inlet in direct communication with the outlet when the sensing means detects condensate at a temperature below a predetermined temperature at the said location.

11. Equipment as claimed in claim 9, in which the control means is adapted to position the valve element to isolate the inlet from the condensate trap and from the outlet when the sensing means detects no condensate and detects a fluid temperature above a predetermined temperature at the said location.

12. Equipment as claimed in claim 10 or 11, further comprising process means disposed upstream of the condensate trap assembly, the process means utilizing fluid flowing in a fluid line which communicates with the inlet of the valve body, the sensing means being responsive to the temperature of the fluid at a location upstream of the process means, and the predetermined temperature being determined by reference to the temperature sensed at the said location upstream of the process means.

* * * * *